(No Model.) 4 Sheets—Sheet 1.
C. H. PLATT.
COMBINED PAVEMENT AND SUBWAY SYSTEM.
No. 552,445. Patented Dec. 31, 1895.
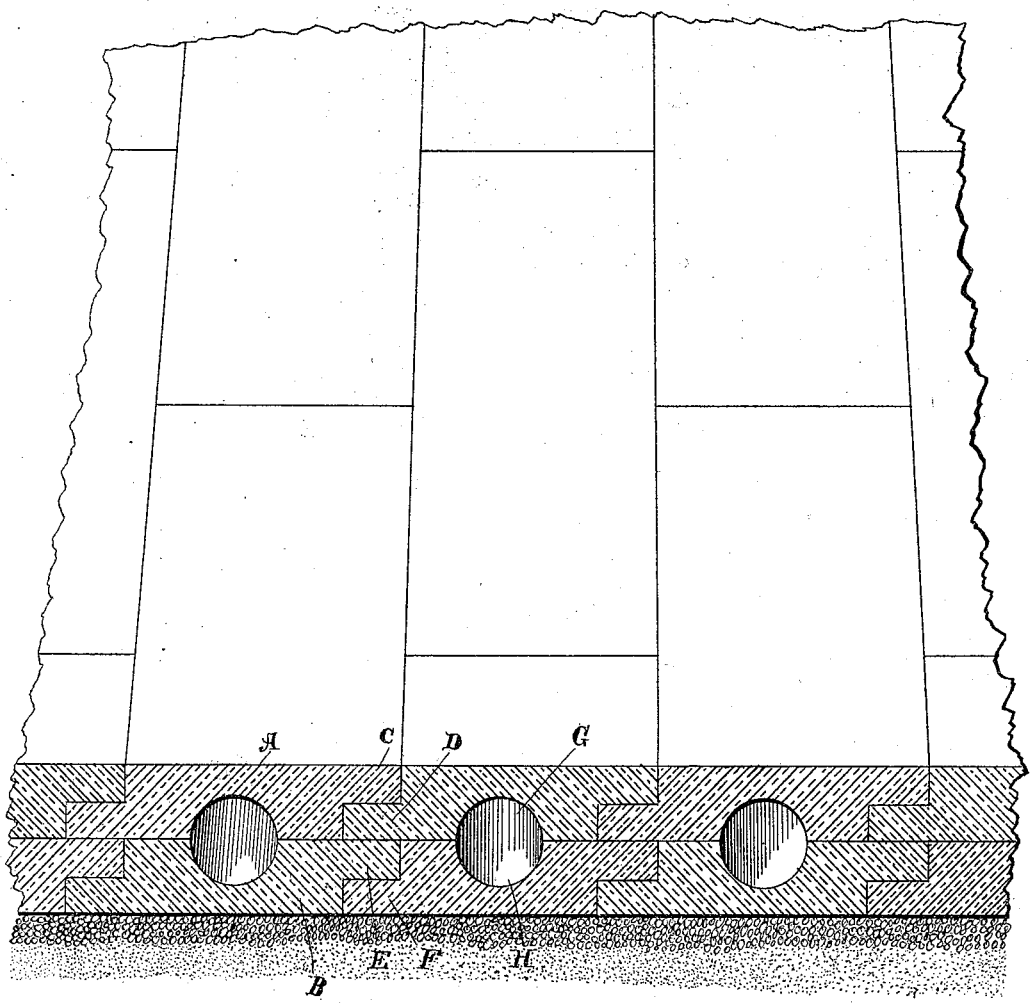

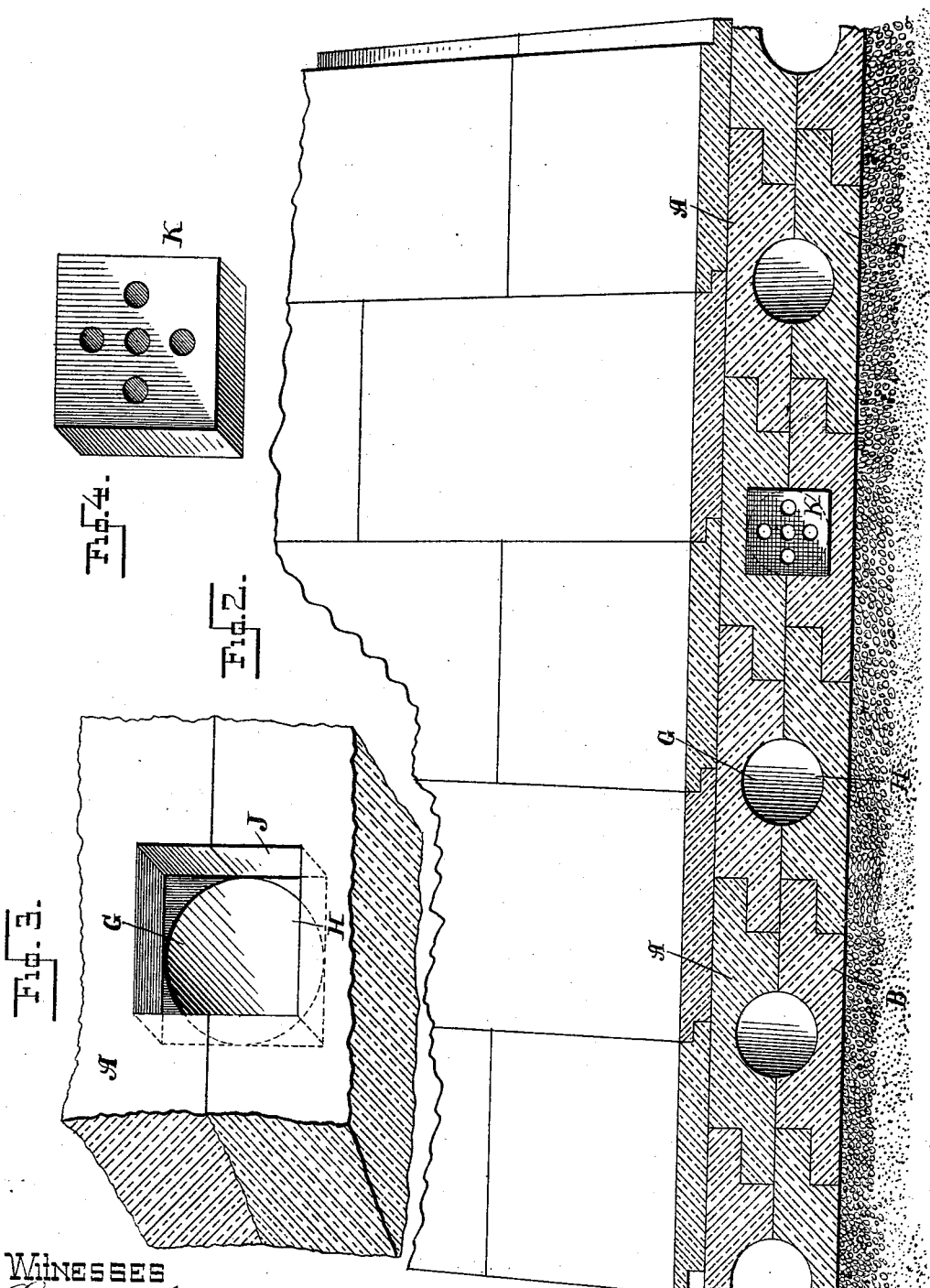

(No Model.) 4 Sheets—Sheet 3.
C. H. PLATT.
COMBINED PAVEMENT AND SUBWAY SYSTEM.
No. 552,445. Patented Dec. 31, 1895.
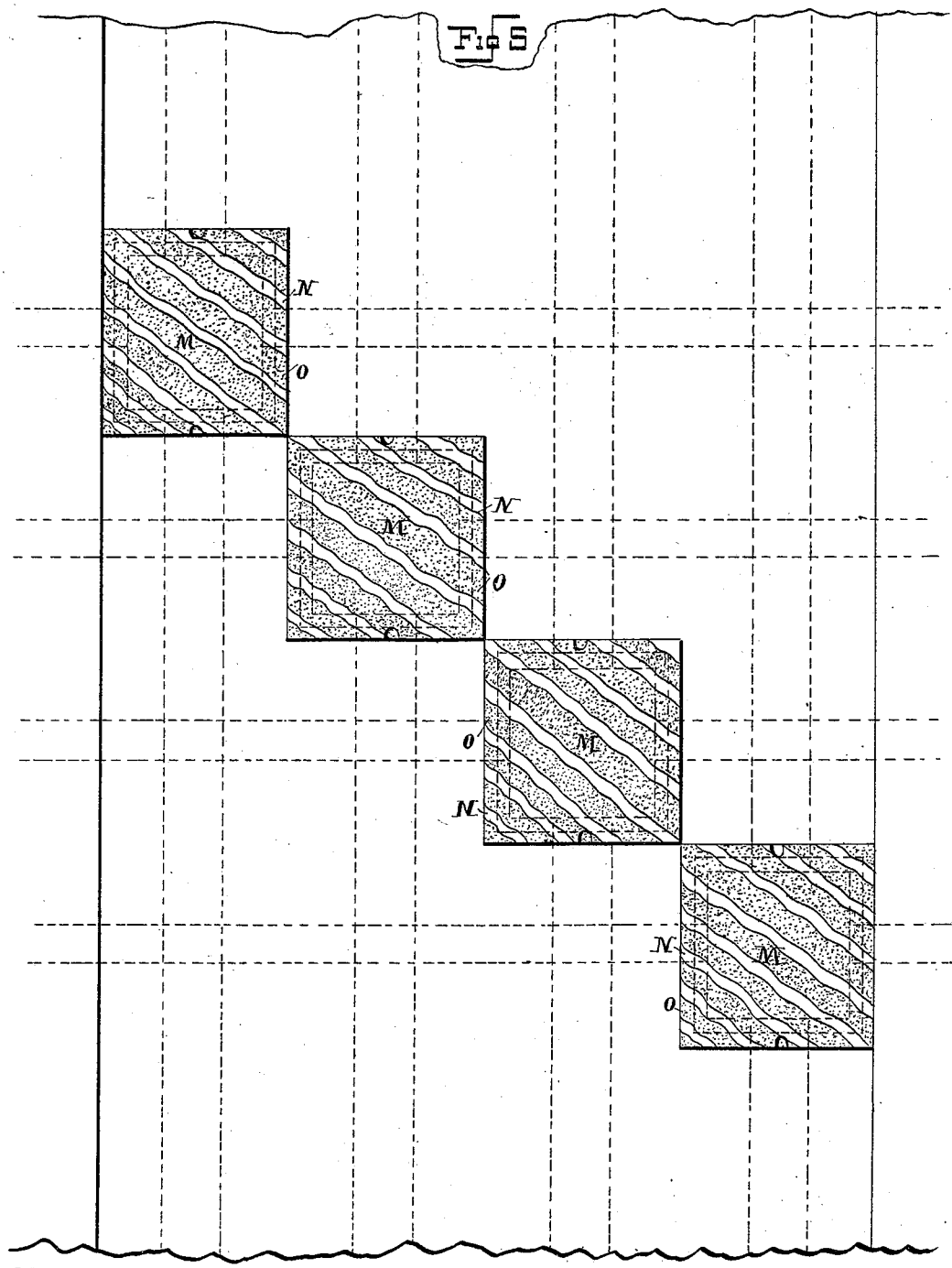

(No Model.) 4 Sheets—Sheet 4.
C. H. PLATT.
COMBINED PAVEMENT AND SUBWAY SYSTEM.
No. 552,445. Patented Dec. 31, 1895.
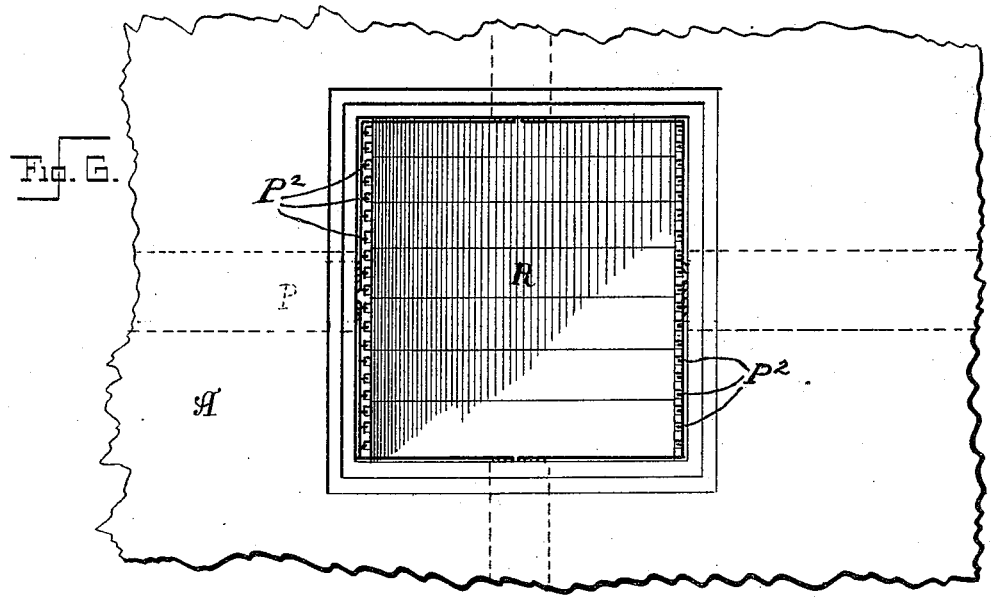
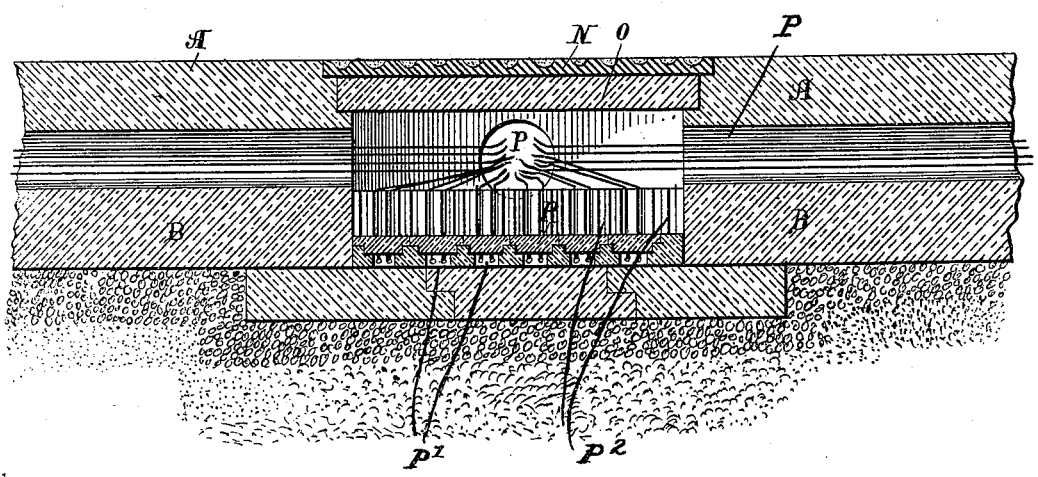

UNITED STATES PATENT OFFICE.

CHARLES H. PLATT, OF NEW YORK, N. Y.

COMBINED PAVEMENT AND SUBWAY SYSTEM.

SPECIFICATION forming part of Letters Patent No. 552,445, dated December 31, 1895.

Application filed July 27, 1894. Serial No. 518,741. (No model.)

*To all whom it may concern:*

Be it known that I, CHARLES H. PLATT, a citizen of the United States, residing at New York, county and State of New York, have invented a new and useful Combined Pavement and Subway System, of which the following is a specification.

The primary object of my invention is to produce a pavement or roadway suitable for towns and cities, which shall be more economical of construction and more durable than anything that has been heretofore employed, and at the same time so constructed that subways or conduits will be incorporated therein, which subways or conduits can be employed for electric wires and for the conveyance of water, gas, or other fluids.

In carrying out my invention, so as to produce the most satisfactory results, I employ a composition which I will term "bituminous concrete," molded into blocks of suitable sizes, preferably four feet in length, eighteen inches in width, and nine inches thick, which blocks when placed in position on the roadway are so arranged as to nicely fit each other, as will be explained in connection with the accompanying drawings, which form a part of this specification.

In the drawings, Figure 1 represents a perspective view of my improved pavement, showing the end thereof in cross-section. Fig. 2 represents a similar view of a modification of my invention. Figs. 3 and 4 represent detail views, hereinafter more fully explained. Fig. 5 represents a system of manholes to be employed in my improved pavement and subway. Fig. 6 represents a plan view of a junction-box to be used in connection with my improved pavement and subway. Fig. 7 is a sectional view of the junction-box and subway.

In the drawings, A represents the upper block of my improved pavement, the lower block B being supported upon a foundation of tamped earth, gravel, or other suitable surface or structure sufficient to support the whole in place, as hereinafter described.

The blocks A are provided with oppositely-extending shelving or other like projections C D respectively flush with the opposite faces of the blocks, by means of which said blocks A are arranged beforehand so as to interlock or fit into each other with great nicety.

The blocks B are provided with similar surfaces and projections E F, which are adapted to be utilized in the same manner. The blocks are also provided with semicircular and longitudinally-arranged arch-shaped openings G, which extend from end to end of said blocks A, the blocks B being provided with similar complementary openings H, which when the blocks A and B are placed in their proper relative positions, as indicated and illustrated in Fig. 1 of the accompanying drawings, form subways, as shown. These subways form ducts or conduits which may be utilized for electric wires and for the conveyance of water, gas and other fluids, inasmuch as said blocks are made of bituminous concrete and are therefore capable of resisting heat and moisture as well as constituting an insulator for the electric wires.

The blocks after being placed in position are united or bound together by a bituminous mastic binder into a solid homogeneous mass, without seams or joints, that is impervious to water and gases and a non-conductor of heat and electricity.

My invention consists in this respect in employing blocks which have been shaped beforehand with the shelves or projections C, D, E, and F, whereby when said blocks are laid upon the surface or foundation they will fit into each other for the purposes described, and also at the same time, the said blocks being molded into shape beforehand to form therein longitudinal semicircular openings, which when said blocks are fitted together, as shown and explained, and united or bound together by a bituminous mastic binder into a solid homogeneous mass without seams or joints, they will provide continuous conduits that are impervious to water and gases and that are non-conductors of heat and electricity.

In Fig. 2 the idea is carried still farther. The longitudinal openings G H are provided with rectangular insets or pockets J, larger than the subway or longitudinal opening and forming shoulders, against which rest the subdividers or perforated rectangular frames K inserted in pockets J when the blocks A and B are being placed in position. (See Figs. 2, 3, and 4.)

The subdividers K when in place can be utilized for separate wires and separate systems of wires as the occasion demands. These subdividers K can be inserted through the manholes shown in Figs. 5, 6 and 7, also, if desired.

In Fig. 5 I show a system of manholes extending preferably diagonally across the pavement or roadway, each manhole connecting with the subway beneath. These manholes are provided with covers M having an iron frame or rim N and a bituminous concrete top O. I consider it preferable to construct the manholes in this manner and consider it an essential feature of my invention.

Figs. 6 and 7 show detail views of the manhole. I utilize the manhole also as a junction-box for electric wires. The wires are led into the manhole through the main conduit or subway, and in the case of cross-wires at right angles to the main subway and leading from or into subsidiary or other conduits, such as P, I provide passages P' extending across the bottom of the junction-box for the reception of the cross-wires, said passages being covered with plates R, which may normally form the bottom of the manhole, which can be lifted off to permit access to the lower connection. There are also vertical channels P² formed in the side walls of the junction-box, forming continuations of the passages P' for the free passage of the wire into and out of the passages P' past the ends of covering-plates R, from and to the cross-conduit.

It will be seen that I have invented and disclosed a novel system of subways built into and forming a part of the roadway, and in connection with said roadway and subway means for securing access to said subways.

I claim—

1. A combined pavement and sub-way constructed of previously formed sectional blocks, each section being formed with a semicircular longitudinally extending recess or opening and oppositely extending shelving projections respectively flush with the opposite faces of the block section; said block sections being joined together in upper and lower layers forming continuous sub-ways of circular cross-section and with the shelving projections interlocking, as set forth.

2. The combination of a combined pavement and sub-ways, with a junction-box, passages in the bottom of the junction box and channels or passages in the vertical walls of the junction box, communicating between crossing subways, covering plates R, a manhole opening into the junction box, and suitable covers, substantially as set forth.

C. H. PLATT.

Witnesses:
M. V. BIDGOOD,
C. M. OTT.